June 18, 1935.    B. F. JENKINS    2,004,950

TORQUE MEASURING DEVICE

Filed March 12, 1932

B. F. JENKINS
INVENTOR

BY
ATTORNEY

Patented June 18, 1935

2,004,950

UNITED STATES PATENT OFFICE 2,004,950

TORQUE-MEASURING DEVICE

Bernard F. Jenkins, United States Navy

Application March 12, 1932, Serial No. 598,360

2 Claims. (Cl. 265—24)

(Granted under the act of March 3, 1883, as amended April 30, 1928; 370 O. G. 757)

This invention relates to means for testing the operating efficiency of mechanisms such as pneumatic or electric drills, that have rotating members driven by individual prime movers, and has for its object to provide a simple, accurate, and inexpensive apparatus for ascertaining and comparing under uniform conditions the capacity of such mechanisms to do work.

With the above and other objects in view, the invention consists in the construction, combination and arrangement of parts as will be described more fully hereinafter.

Reference is to be had to the accompanying drawing forming a part of this specification, in which like reference characters indicate corresponding parts throughout the several views, and in which:

Figure 1:
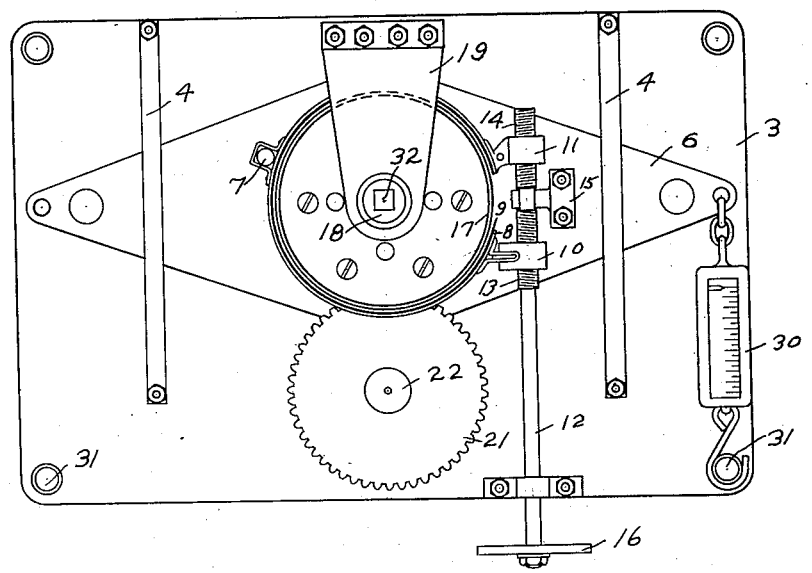
Fig. 1 is a top plan view of my invention.
Figure 2:
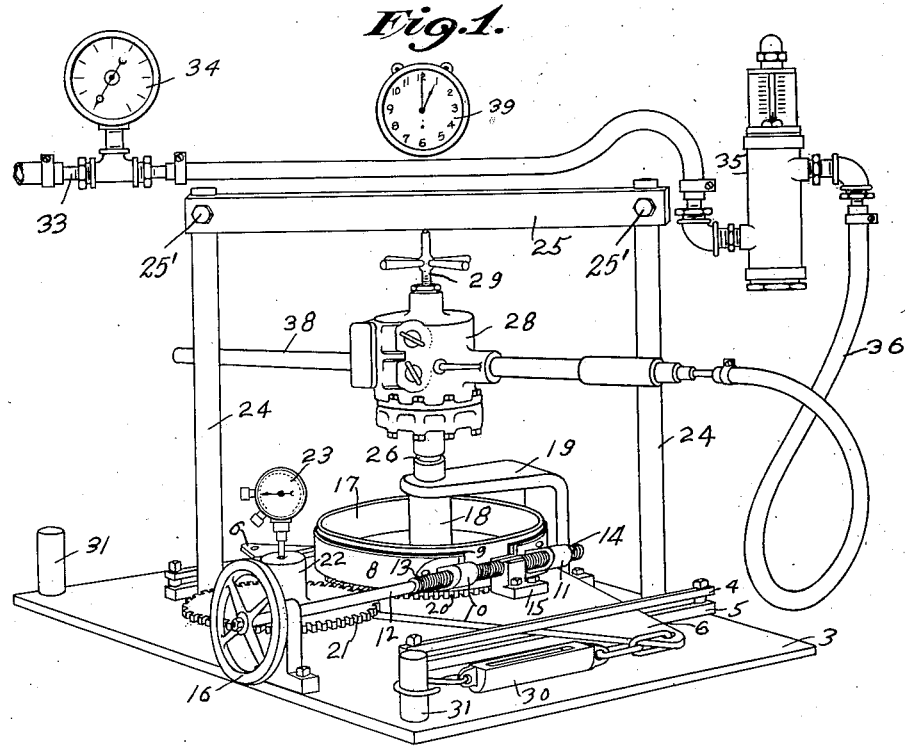
Fig. 2 is a side elevational view, showing the disposition of certain auxiliary instruments employed.

Secured to base 3 are two pairs of spaced apart bars 4 and 5 that serve as guides for the ends of the brake beam 6. Brake band anchor 7 is fixed to the beam and serves to retain in position the resilient brake band 8 with friction lining 9. Internally threaded brake lugs 10 and 11 are attached to the ends of brake band 8, one having a right hand thread and the other a left hand thread. Brake shaft 12 has oppositely threaded portions 13 and 14 to engage the threads in the lugs 10 and 11 and a reduced unthreaded portion therebetween that seats in the brake shaft anchor 15 to prevent longitudinal movement of the shaft. Hand wheel 16 is fixed to the outer end of shaft 12 to rotate the shaft to set or release the brake band.

Brake drum 17 is mounted on base 3 to rotate independently of brake beam 6 and has a hub or stub shaft 18 journalled in bracket 19 that is also fixed to base 3. A gear 20 is secured to drum 17 to rotate therewith. A gear wheel 21 is mounted on base 3 in mesh with gear 20 and is provided with a live center 22 to cooperate with a tachometer 23. Standards 24 are fixed to base 3 to carry a beam 25 that passes over the center of rotation of drum 17 and is adjustably secured to the standards 24 by friction clamps 25'. A short shank 26 of a size suited to the drill is chucked in the drill in place of a bit; this shank has a squared outer end that is received in a recess 32 of corresponding shape and size in the hub or stub shaft 18. The drill 28 is held firmly in place by a jack screw 29 that bears against the top of the drill and against the underside of beam 25, the beam being adjustable up and down to accommodate the various sizes of drills. A spring balance 30 may be attached to either end of brake beam 6 and to the adjacent post 31 fixed to base 3, depending upon the direction of rotation of drum 17.

A test is not accurate unless the same quantity of air at the same pressure is used in each instance or unless the values of these factors are known and taken into consideration. The air to operate drill 28 passes through a pressure control valve (not shown) to pipe 33 to which is attached a pressure gauge 34 and thence through a flow meter 35 whence it is carried to the drill by hose 36. The exhaust air passes through pipe 38. A clock 39 may be conveniently placed to enable the operator to time the test. If an electric drill is to be tested a volt meter and ammeter are substituted for the pressure gauge and the flow meter, or a wattmeter may be used in lieu thereof.

The method of operation is as follows:

A standard drill of the type to be tested (preferably a new one) is mounted on the apparatus and set into operation. Brake shaft 12 is rotated by means of hand wheel 16 to set brake lining 9 against drum 17. The friction between the lining and the drum will tend to drag brake beam 6 around with the drum but this will be resisted by the spring of balance 30, drum 17 will rotate inside the brake band to drive gear 21, and the magnitude of the frictional pull will be shown by the reading on the balance. When the indication of the balance has the desired value the pressure and volume of flow of the air are taken, and the number of turns of gear 21 in a chosen time interval is observed by means of tachometer 23. The drill to be tested is then substituted for the standard, and the number of turns of the gear 21 in the same time interval is observed, the volume and pressure of the air being also noted. If the power supplied to the two drills is the same in equal intervals of time the efficiency of the tested drill is given by the quotient of the number of turns of gear 21 when driven by the second drill divided by the number of turns when driven by the first drill. When the efficiency of a tool is unduly low it may be adjusted or parts thereof may be replaced until its performance is satisfactory. If there is variation in either the pressure of the volume of the air during the test that must be included in the computation. However, since the air is usually supplied to the device through a pressure control valve (not shown), it is unnecessary in practice to consider changes in the air pressure. The volume of air consumed may be too high due to wear of the tool and if it is in excess of 10 per cent more than that used by the standard tool, those drawing such abnormal volumes are sent for repairs.

If a number of drills of the same type are to be tested it is not necessary to use the standard before each one, but the setting of the apparatus should be checked by the standard occasionally to make sure there has been no change that would introduce errors into the results.

While my invention has been described, for purposes of illustration, in connection with a pneumatic drill it is not to be understood as being limited thereto, as it may be utilized to measure or compare the torque of any mechanism that can be operatively connected thereto.

It will be understood that the above description and accompanying drawing comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalty thereon.

I claim:

1. In a torque-measuring device, a base, a brake drum rotatably mounted thereon, a brake beam mounted between said drum and said base, guides in which said beam is oscillatably slidable, a brake band disposed around said brake drum, a brake anchor fixed to said beam and connected to said brake band, a brake shaft anchor on said beam, a brake shaft having a portion seated in said brake shaft anchor and having oppositely threaded portions on the opposite sides of said portion, suitably internally threaded lugs attached to said brake band adjacent the ends thereof and respectively engaged with the said threaded portions, a bracket carried by said base, a member attached to said drum and journalled in said bracket, said member having a polygonal recess in its upper face, standards fixed to said base, a beam slidable on said standards and passing over the center of said member to hold in place a device to be tested with a rotating portion thereof connected to said member, and a spring balance having one end fixed and the other connected to an end of said beam.

2. In a torque-measuring device, a base, a brake drum rotatably mounted thereon, a brake beam mounted between said drum and said base, guides in which said beam is oscillatably slidable, a brake band disposed around said brake drum, a brake anchor fixed to said beam and connected to said brake band, a brake shaft anchor on said beam, a brake shaft having a portion seated in said brake shaft anchor and having oppositely threaded portions on the opposite sides of said portion, suitably internally threaded lugs attached to said brake band adjacent the ends thereof and respectively engaged with the said threaded portions, means for connecting to said drum a rotating part of a device to be tested, and means to measure the pull on said beam due to friction between said drum and said brake band.

BERNARD F. JENKINS.